Oct. 23, 1956  W. E. GREEN  2,768,040

PACKED PISTON

Filed Aug. 31, 1953

INVENTOR:
WILLARD E. GREEN
BY John F. Schmidt
ATTORNEY

United States Patent Office 2,768,040
Patented Oct. 23, 1956

2,768,040

PACKED PISTON

Willard Edward Green, Michigan City, Ind., assignor to Joy Manufacturing Company, Pittsburgh, Pa., a corporation of Pennsylvania Application August 31, 1953, Serial No. 377,304

12 Claims. (Cl. 309—29)

This invention relates to a packed piston, and more specifically to an expander for biasing the piston packing outward against the cylinder wall.

There are numerous applications in industry for compressed air in which it is required that the compressed air be free of hydrocarbons because of the danger of an explosive mixture. Other industrial applications, such as those requiring the compression of oxygen, equally require a total absence of hydrocarbons. In the case of compressors, this requirement means a compressor capable of operating without lubricants in the compression chamber. Although carbon packing (or rings) for compressor pistons is old in the art, it has never been entirely satisfactory because of the rapid wear of the carbon rings, unequal wear of the rings resulting in leakage, and the like.

It is accordingly an object of this invention to provide a packed piston for a gas pump or compressor which requires no lubricant in the cylinder. More specifically, it is an object of this invention to provide an improved expander for segmental-type carbon packing for compressor pistons. These and other objects are accomplished by means of expanders for segmental rings which bring an even pressure to bear against the ring segments without causing breakage or undue wear of the carbon ring pieces.

Figure 1:
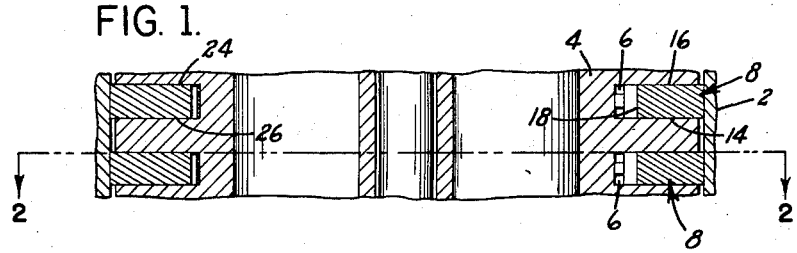
Fig. 1 is a longitudinal sectional view through a portion of a piston-type compressor.
Figure 2:
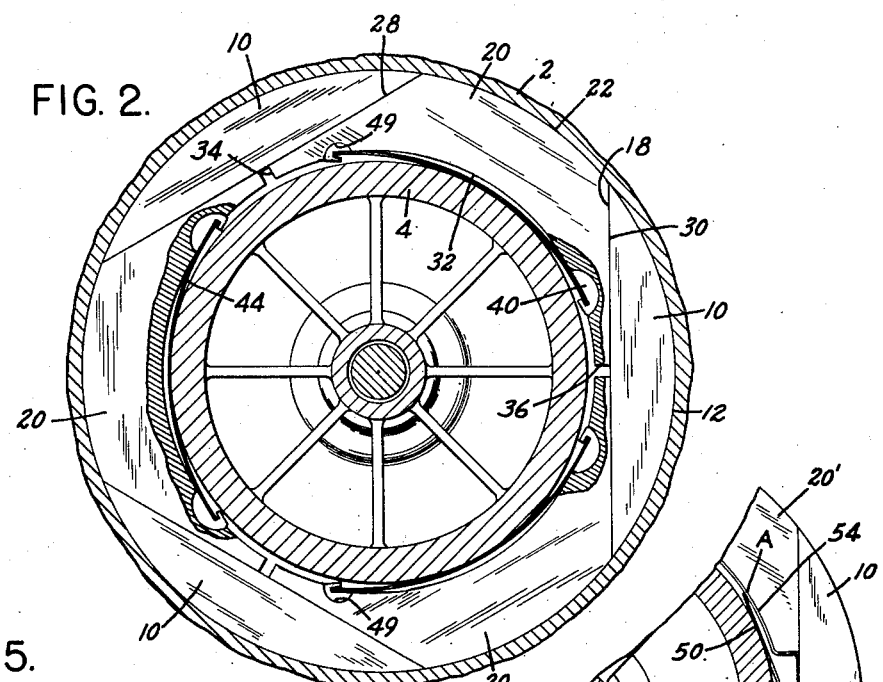
Fig. 2 is a view in section on line 2—2 of Fig. 1.
Figure 3:
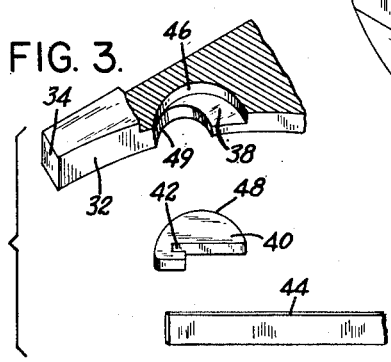
Fig. 3 is an expanded view of a portion of a carbon ring segment, a portion of the ring segment broken away and in section in order more clearly to show details of the invention.

Referring now in detail to Figs. 1–3, a conventional compressor cylinder is shown at 2 provided with a piston 4 reciprocable therein. Piston 4 is provided with one or more, preferably a plurality, of grooves 6 to receive packing means, conventionally referred to as piston rings.

A segmental piston ring or packing is indicated generally at 8 and, in the embodiment shown, comprises six pieces. Three of the pieces, namely those shown at 10, consist of carbon blocks having four surfaces: one cylindrical surface 12 adapted to engage the cylinder wall or bore, two plane surfaces 14 and 16 which bound the block in the axial direction, and a tangential plane surface 18 at right angles to the surfaces 14 and 16.

The three blocks 10 are circumferentially spaced about the piston, and between them are arranged other blocks 20. Blocks 20 also have cylindrical surfaces, shown at 22, adapted to engage the cylinder wall; substantially plane surfaces 24 and 26 bound blocks 20 in an axial direction; tangential plane surfaces 28 and 30 are provided to engage the tangential surfaces 18 of blocks 10; cylindrical surfaces 32 bound the blocks to form inner surfaces which, when the blocks are new, lie close to the bottom of the piston groove; other plane surfaces 34 and 36 connect the cylindrical surfaces 32 with the tangential surfaces 28 and 30 respectively to form shoulders or ends of the segments.

In the embodiment of the invention shown in Figs. 1–3, the segments 20 are provided with recesses 38 (see especially Fig. 3). Recesses 38 are adapted to receive reaction members 40 having sockets 42 to receive the ends of a resilient member 44 which is in fact a piston ring expander. In the preferred embodiment, recesses 38 and reaction members 40 are provided with cooperating arcuate surfaces 46 and 48 respectively. As is best seen in Fig. 2, resilient members 44 lie in the groove 6 with their ends in engagement with the sockets 42 of reaction members 40 and with the portion between the ends in contact with the piston 4, the contact being of course at the bottom of the groove.

Segments 20 are preferably additionally recessed as shown at 49 in order to permit the ends of members 44 to engage sockets 42 without contacting the segments 20. Recesses 49, it will be understood, are provided because members 44 are preferably as wide as grooves 6, whereas reaction members 40 are of course considerably narrower. This is best seen in Fig. 1.

Figure 5:
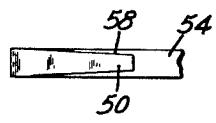
Fig. 5 is a view from line 5—5 of Fig. 4.
Figure 4:
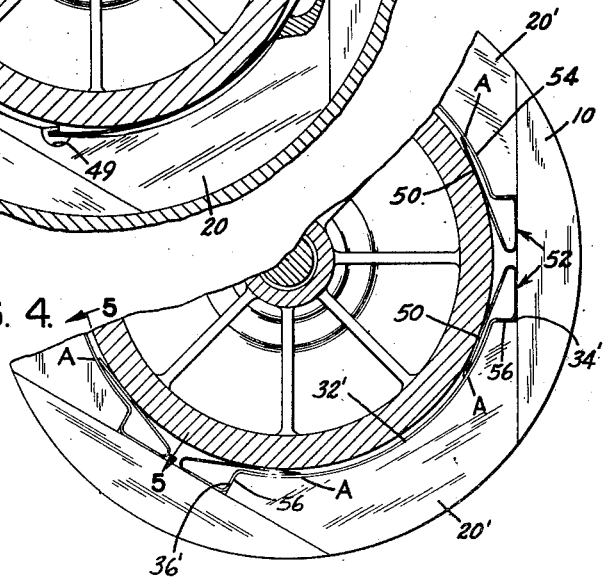
Fig. 4 is a view similar to Fig. 2 but showing another embodiment of the invention.

Turning now to Figs. 4 and 5, it will be seen that the ring asegments there shown are generally similar to those shown in Fig. 2, the principal difference being that the segments 20' are cut off shorter at the ends to provide wider spaces between the adjacent ends of adjacent segments 20'.

In the embodiment shown in Figs. 4 and 5, the ring expander consists of an elongated member which is preferably a metallic strip having good spring characteristics. The elongated member is provided with resilient ends bent back upon themselves as shown at 50 to form loops indicated generally at 52. The loops have short sides consisting of the bent back ends 50, and have connected long sides 54, the connected long sides 54 being of course the intermediate portion of the elongate member.

From another viewpoint, the expanders of the embodiment shown in Fig. 4 may be considered as elongate members having resilient return-bend ends or loops 52. In the embodiment shown in Fig. 4, the connected long sides of the loops are shaped to fit the inner cylindrical surfaces 32' of the blocks 20'. In the preferred form of the invention, the elongate means is provided with shoulders 56 which engage the surfaces 34' and 36' of the segment 20'. The return-bend ends or loops are of course adjacent the shoulders, and the short sides 50 of the loops are biased radially inward in order to press the ring segments radially outward against the cylinder walls.

Short sides 50 are preferably tapered as shown at 58 in Fig. 5. This taper is desirable because, when the parts are new, the very ends of short sides 50 may for a time contact the connected long sides 54 at A, Fig. 4. This contact might cause sufficient wear of long sides 54 to cut the return bend ends or loops 52 off, if it were not for the taper.

Operation

The operation of the two embodiments of the invention described above will be readily understood by those skilled in the art, so it need not be set forth here in detail. However, a résumé or summary might contribute to a better understanding of the invention. Referring first to the embodiment shown in Figs. 1–3, it will be understood from the foregoing by those skilled in the art that the resilient member 44 pushes substantially radially outward against the several ring segments by means of the reaction members 40. The cooperating arcuate surfaces 46 and 48 permit the reaction members to have a limited rocking movement in the recesses 38. The resilience of the reaction members 44 keeps the ring segments tightly in engagement with the cylinder wall and compensates for wear in the ring segments.

As indicated above, the ring segments 10 and 20 are preferably carbon so as to require no lubrication. These are therefore rather brittle and liable to crumble, especially under the influence of a sharp instrument as would be the case if resilient members 44 were disposed with their ends bearing directly on the carbon blocks or segments 20. In my invention, this weakness of the carbon blocks is overcome by the use of reaction members 40, which are preferably metallic and therefore possess the necessary strength, but still bring the necessary pressure to bear on the carbon block through the cooperating arcuate surfaces 48 and 46.

Referring now to the embodiment of the invention shown in Fig. 4, it will be understood by those skilled in the art that the parts are there shown in the position they would occupy when the ring segments 10 and 20' are new and have not yet been subject to wear. Under these circumstances, the extreme inner ends of the short sides 50 are in contact with (or nearly so) the intermediate portion, or connected long sides 54, substantially as shown at A in Fig. 4. As the ring segments wear, the loops 52 will open up, with the short sides 50 gradually pushing the long sides 54 outward away from the bottom of the groove.

It will be apparent from the foregoing that I have here provided an improved form of piston packing, more specifically an improved form of expander for segmental carbon piston rings which will result in longer wear with less breakage of the segments. Other advantages will be apparent to those skilled in the art.

While there are in this application specifically described two forms which the invention may assume in practice, it will be understood that these forms of the same are shown for purposes of illustration and that the invention may be further modified and embodied in various other forms without departing from its spirit or the scope of the appended claims.

I claim:

1. In a packed piston having a groove and a packing segment in the groove, means to bias the packing segment outward comprising an elongated member having resilient ends bent back upon themselves to form loops which are open toward the middle of the member when unrestrained.

2. A piston ring expander comprising an elongate member having resilient return-bend ends, the return-bend ends forming loops having short sides and connected long sides, the short sides being normally biased away from the long sides and in contact with the piston and the long sides being normally in contact with the ring.

3. A piston ring expander comprising an elongate member having return-bend ends, the return-bend ends forming loops having short sides and connected long sides, the short sides being normally biased away from the long sides.

4. A piston ring expander having elongate means adapted to bear against a piston ring portion, and, at the ends of the elongate means, means yieldingly to press against the piston to bias the ring portion radially outward.

5. A piston ring expander having elongate means adapted to bear against a piston ring segment, shoulders at the ends of the elongate means to engage the ends of the segment, and means adjacent the shoulders to bias the ring segment outward.

6. A piston ring expander having elongate means adapted to bear against a piston ring segment, a shoulder at each end of the elongate means to engage a corresponding end of the segment, and means adjacent the shoulders yieldingly to press against the piston to bias the ring segment radially outward.

7. A piston ring expander comprising a resilient yieldable strip having an elongate portion adapted to bear against a piston ring segment, shoulders formed at the ends of the strip to engage the ends of the segment, and return-bend ends adjacent the shoulders forming loops having short sides normally biased radially inward against the piston to bias the ring portion radially outward.

8. In combination, a piston element having a circumferential groove, a piston ring in said groove and comprising in circumferential alternation a plurality of wedge elements and a plurality of other elements in mutual engagement, each of said wedge elements and the bottom of said groove providing when the ring is new a pair of coaxial surfaces, elongated springs between each pair of coaxial surfaces, each of said springs having a central portion having circumferentially extended surface contact with one of said coaxial surfaces and having portions constituting end continuations thereof transmitting a generally radial force to the element on which the other of said coaxial surfaces is formed to cause said wedge elements to tend to move radially and to maintain an outwardly directed pressure upon said other elements, said portions constituting end continuations having coaction with said wedge elements limiting circumferential movement with respect to the latter.

9. The combination as set forth in claim 8 with a pair of reaction members disposed in biasing contact with each of said wedge elements, each of said springs having its ends in engagement with one of said pairs of reaction members.

10. The combination as set forth in claim 8 in which said wedge elements are provided with recesses, a pair of reaction members in the recesses of each of said wedge elements and arranged for limited movement in the recesses, and each of said springs has its ends in engagement with one of said pairs of reaction members.

11. The combination as set forth in claim 8 in which each of said wedge elements is provided with a pair of circumferentially spaced recesses, a pair of reaction members movably disposed in the recesses and having sockets, each of said spring members having its ends in engagement with the sockets of one of said pairs of reaction members, and each of said springs being in engagement intermediate its ends with said piston element.

12. The combination as set forth in claim 8 with a pair of reaction members disposed in biasing contact with each of said wedge elements, each of said springs having its ends in engagement with one of said pairs of reaction members and in engagement intermediate its ends with the piston element.

References Cited in the file of this patent

UNITED STATES PATENTS

| | | |
|---|---|---|
| 1,401,178 | Mohn | Dec. 27, 1921 |
| 2,554,758 | Vickers | May 29, 1951 |
| 2,623,797 | Kennon | Dec. 30, 1952 |